United States Patent
Buonavita

[11] 3,721,928
[45] March 20, 1973

[54] CURRENT MONITORING APPARATUS
[75] Inventor: Carlos E. Buonavita, San Gabriel, Calif.
[73] Assignee: Burroughs Corporation, Detroit, Mich.
[22] Filed: April 29, 1971
[21] Appl. No.: 138,554

[52] U.S. Cl. ................................................335/204
[51] Int. Cl. .............................................H01h 9/00
[58] Field of Search.....................................335/204

[56] References Cited
UNITED STATES PATENTS

| 3,569,880 | 3/1971 | Wahigren | 335/204 |
| 3,188,427 | 6/1965 | Cooper et al. | 335/204 |
| 3,538,386 | 11/1970 | Schweitzer, Jr. | 335/204 |

Primary Examiner—Harold Broome
Attorney—Christie, Parker and Hale

[57] ABSTRACT

Apparatus is disclosed for detecting when the current flowing through a current carrying member reaches a predetermined magnitude. Switch means responsive to the magnetic field about the member is mounted adjacent the current carrying member. Additionally, adjustible means are included for selectively varying the sensitivity of the switch means to the magnetic field in order to control the sensitivity of the switch means to the current flow through the current carrying member so that a desired magnitude of current to be detected is determined.

5 Claims, 3 Drawing Figures

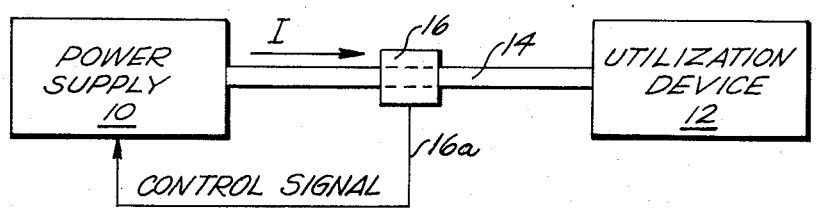
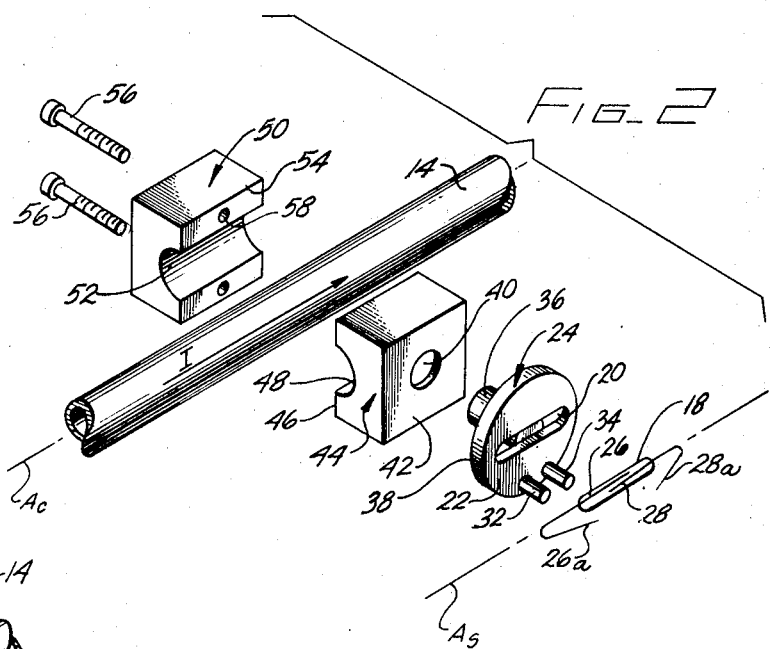
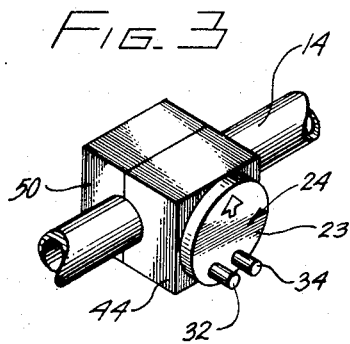

3,721,928

CURRENT MONITORING APPARATUS

BACKGROUND OF THE INVENTION

1. Field of the Invention

This invention relates to the monitoring of current flowing through a current carrying member. More specifically, the invention relates to apparatus for detecting when the current flow reaches a predetermined magnitude.

2. Description of the Prior Art

It is desirable in many contexts to be able to monitor the current flowing through a conductor, such as a cable or the like. For instance, it might be necessary to have such information for control systems, etc. Additionally, it is sometimes necessary to cut off the current source when the current reaches a predetermined magnitude so that a utilization circuit is not damaged. Thus, if a current carrying cable is connected between a power supply and a utilization device, means should be included for monitoring the current flowing through the cable and for disabling the power supply when the current reaches a predetermined magnitude.

Most present current monitoring system usually require that the cable link be actually broken and an impedance element inserted as a coupling element. The voltage monitored across the impedance is indicative of the current flow through the cable. Preferably, the monitoring means is a voltage threshold device which passes a control signal to the power supply to disable it whenever a predetermined magnitude of current is reached, i.e., whenever the voltage across the coupling impedance reaches a preset threshold level. In this manner, the power supply can never become overloaded, nor the current so great as to damage whatever utilization device or circuitry is employed.

Although present monitoring systems of the type above described are reasonably effective, they suffer from major disadvantages. For instance, the voltage threshold device, being coupled directly across an impedance in circuit with the cable, imposes limitations on the circuit design. Additionally, since the threshold device is not at all isolated from the cable connected circuit, it too draws some current which must be compensated for. Such systems are also very expensive to fabricate and require the cable to be broken and exposed at the coupling impedance thereby increasing the risk of injury to the person monitoring the current flow. Furthermore, such threshold devices can only be used to measure current flow through cables or the like which have been first broken and spliced by an impedance element.

Magnetically operated current sensors have been proposed which do not require a break in the line. However, such devices are generally intended to detect a fixed level of current in the conductor and do not have facilities for easy adjustment. Any adjustment thereof requires a cumbersome and expensive mounting and adjustment.

SUMMARY OF THE INVENTION

In regard to apparatus, the present invention provides a simple, rugged and extremely inexpensive current monitoring device which may be used to disable a power supply when the current flowing through an output cable from the power supply reaches a predetermined magnitude. The device essentially includes a current sensitive switch which is electrically isolated from the cable connected circuitry so as not to impose limitations on the design of the latter. In this regard, it is not a requirement to first break the cable and splice it with a coupling impedance. In fact, the device can monitor at any desired position along the cable and can be used with any current carrying member without first requiring preparation thereof, such as by breaking and splicing.

Briefly, a current level detector according to the present invention is especially adapted for use on a large, high current conductor. The detector includes first and second mounting members adapted to be mounted about and on such a conductor. One of the mounting members has a first circular bearing portion adapted for rotatable mounting a member. Means is provided for securing the mounting members together about such a conductor. A magnetic field responsive switch is mounted on a manually operable knob. The knob has a second circular bearing portion rotatably mounted on the first bearing portion. Means is provided for mounting the switch on the knob so that rotation of the knob alters the position of the magnetic field responsive switch and thereby varies the magnetic field from the current carrying conductor passing along a predetermined axis of the switch.

With such an arrangement, a very low cost and inexpensive adjustable current monitoring switch is provided.

BRIEF DESCRIPTION OF THE DRAWING

These and other aspects and advantages of the present invention are more clearly described with reference to the accompanying drawing, wherein:

FIG. 1 is a schematic block diagram of a system in which the present invention may be used;

FIG. 2 is an exploded perspective view of an embodiment of the present invention; and FIG. 3 is an assembled perspective view of the embodiment of FIG. 2; FIG. 3 also shows an indexed disk 23 on the face of the knob 24 and which is not shown in FIG. 3.

DESCRIPTION OF THE PREFERRED EMBODIMENTS

FIG. 1 shows a typical system in which the present invention can be used. For instance, a power supply 10 is coupled to a utilization device 12 by means of a connecting conductor or cable 14. Cable 14 is designed to carry a current I from power supply 10 to utilization device 12. The current sensing apparatus is shown generally as a block referenced 16. Apparatus 16 is designed to detect a current flow through cable 14 which exceeds a predetermined magnitude. The precise manner in which this is accomplished is explained below. Apparatus 16, in response to the detection of a current of said predetermined magnitude, develops a control signal on line 16a which is fed back to the power supply to control the latter, such as by disabling it. In this manner, current I is prevented from exceeding the predetermined magnitude.

Magnetic reed switches are well known and generally comprise an evacuated vessel in which is secured a pair of overlapping and spaced apart contacts as depicted at 18 in FIG. 2. The contacts are made of a conductive and magnetic material. Flux, from a magnetic field, when appropriately applied through the contacts causes the overlapping contacts to attract each other. The contacts act as springs tending to normally remain separated. When the flux passing through the contacts is sufficiently high, the magnetic attraction of the contacts pulls the contacts together, causing electrical contact therebetween. One such reed switch positioned inside of a coil is shown in U.S. Pat. No. 2,203,321.

Apparatus 16 is more clearly shown in FIG. 2 and comprises a magnetic field responsive switch or reed switch 18 which is positioned or housed within a corresponding elongate recess 20 defined in a circular front face 22 of a cylindrical knob 24. The switch 18 is held in opening 20 by epoxy (not shown) and also by the combination of a projection 36, affixed to the rear of knob 24, and a thin, non-conductive disk 23 affixed to the face 22 of the knob. The disk 23 is only shown in FIG. 3 where it covers over the opening 20. Magnetic reed switch 18 (shown in the drawing) includes a pair of parallel planar contact plates or reed contacts 26 and 28 which overlap each other in the center of an elongate glass container 30 within which contacts 26 and 28 are enclosed. The contacts 26 and 28 are made of a conductive and magnetic material. Each contact has a conductive segment 26a and 28a, respectively, which is situated without container 30. Segments 26a and 28a are connected to conductive terminals 32 and 34 of knob 24.

Knob 24 is fabricated of non-magnetic material, such as wood or plastic, and includes cylindrical plug-like projection 36 which forms a bearing extending laterally from a rear face 38 of the knob. Projection or bearing 36 is designed to be rotatably mounted on a circular bearing 40a within a corresponding circular aperture 40 defined through a front face 42 of a mounting member or block half 44. In this manner, knob 24 forms a manually adjustable means which is exposed from block 44 and may be rotated relative to block half 44. A rear face 46 of block half 44 has a semi-cylindrical recess 48 opening convex toward a block 50. The radius of curvature of recess 48 is preferably equal to the radius of curvature of connector cable 14. Block half 44 is adapted to be connected to substantially identical block half 50 having a semi-cylindrical recess 52 defined in a rear face 54 thereof. The radius of curvature of recess 52 equals that of recess 48 and cable 14 so that block halves 44 and 50 may be clamped about cable 14. The block halves may be clamped together by a pair of bolts 56 passing through a corresponding pair of holes 58 defined through block half 50 and adapted to be received within a corresponding pair of tapped holes (not shown) defined in rear face 46 of block half 44. As with knob 24, block halves 44 and 50 are fabricated of non-magnetic material. Thus formed block 50 and bolts 56 form means for rigidly affixing the mounting member or block half 44 to the cable 14.

Assuming that current I is flowing through the cable as shown in FIG. 2, it is known that a magnetic field is developed along the length of the cable having lines of flux circling the cable. If one considers a single plane perpendicular to the axis of the cable, the magnetic lines of force are represented by a plurality of circles concentric with the cable. The circles are of different radii with those closest the cable of greater magnetic strength than those further away. At any given distance R from the axis of the cable, assuming the cable has a length substantially greater than R, the flux density B can be expressed according to the following formula:

$$B = (\mu_0/4\pi) \cdot (2I/R)$$

where $\mu_0$ is a proportionality constant. In other words, the flux density is inversely proportional to the distance R from its axis and is directly proportional to the current flow in the cable.

With the foregoing in mind, consider the operation of the apparatus of FIGS. 2 and 3. Block halves 44 and 50, as well as knob 24, are dimensioned so that reed switch 18 is located closely adjacent cable 14 so as to reside in a region of relatively high magnetic strength. This maximizes the sensitivity of the switch to the magnetic field.

The contacts 26 and 28 are elongated within the vessel along an imaginary axis of the switch 18 and thus define a low reluctance path due to the contacts along such axis. The axis is depicted at $A_s$ in FIG. 2. The cable 14 also has an imaginary axis immediately adjacent to switch 18 extending along its length. This axis is depicted at $A_c$ in FIG. 2. The knob 24 is situated in the block half 44 and the switch 18 is mounted on the knob 24 so that rotation of knob 24 rotates the switch 18, causing the imaginary axis $A_s$ to rotate in a plane parallel to a plane through the axis $A_c$ of cable 14 and at the same time rotate relative to a plane perpendicular to the axis $A_c$ of cable 14.

If knob 24 is positioned with reed switch 18 having its axis $A_s$ tangential with the lines of flux and perpendicular to the axis $A_c$ of the cable, switch 18 is most sensitive to the magnetic field. This is due to the fact that the contacts 26 and 28 act as a low reluctance path for the flux going around the cable 14. In other words, the flux is drawn into and passes through the length of the low reluctance contacts 26 and 28 within the vessel. As a result, a high concentration of flux is created at the gap of the reed contacts creating magnetic attraction between the contacts. If the reed switch is positioned with the axis $A_s$ parallel to the axis $A_c$ of the cable, it is least sensitive to the magnetic field of the cable. This is due to the fact that very little, if any, flux passes through the gaps of contacts 26 and 28. As switch 18 is rotated in either direction out of a position in which its axis $A_s$ is parallel to the axis $A_c$ of the cable, the sensitivity of the switch increases as more flux passes between the contact gaps. Therefore, the sensitivity of reed switch 18 to the magnetic field about cable 14 and thus to the current flow (since B is proportional to I), is variable by selectively varying the orientation of the switch.

The disclosed position and direction of rotation of contacts 26 and 28 is preferred because it allows the contacts to be placed closest to the cable 14 and receive maximum effect from the magnetic field around the cable. However, it will be seen that within the broader concepts of the invention the contacts 26 and 28 may be rotated in other directions in order to change or vary the amount of flux passing between the contacts 26 and 28.

It will now be seen that the control signal represented at line 16a of FIG. 1 is formed by the closure of contacts 26 and 28. The closure of contacts 26 and 28 causes a short circuit between conductive terminals 32 and 34 and occurs when the magnetic field passing through magnetic reed switch 18 exceeds some predetermined value established for the switch.

As best shown in FIG. 3, front face 22 of knob 24 may be fitted with indexed disk 23 which may include an arrow index which is designed to point to one of a plurality of indices (not shown) defined on surface 42 of block half 44 and spaced uniformly about a selected quadrant of the knobs. Thus, apparatus 16 may be calibrated to indicate the precise magnitude of current which is desired to be protected. More specifically, a number representing the detectable magnitude of current with switch 18 positioned parallel to the cable axis may be positioned adjacent the right-most or left-most portion of the knob; whereas a number representing the detectable magnitude of current with switch 18 positioned perpendicular to the cable axis may be positioned adjacent the lower or uppermost portion of the knob. Various numbers may be positioned on surface 42 between the above two mentioned numbers, the values of which represent distinct detectable current magnitudes within the range established by said two mentioned numbers.

As an example, if the capacity of cable 14 is 400 amps, the number adjacent the right or left-most point on the knob will be close to 400 since switch 18 is least sensitive to the magnetic field when positioned parallel to the cable axis. Correspondingly, the number adjacent the upper or lower-most point on the knob will be close to 0 since switch 18 is most sensitive to the magnetic field when positioned perpendicular to the axis of the cable.

What has been described in terms of apparatus, therefore, is a variable current detector switch for detecting when the current flow through a current carrying member reaches a predetermined magnitude. Switch means are mounted adjacent the member and responds to the magnetic field developed by the current. Means selectively varies the sensitivity of the switch means to the magnetic field in order to control the sensitivity of the switch means to the current flow through the current carrying member so that a desired magnitude of current to be detected is determined. Preferably, the switch means is a reed switch having overlapping contacts formed of a magnetic material. The means selectively varying the sensitivity of the switch means comprises means for varying the flux passing between the contacts. In of FIGS. 2 and 3, the means for varying the flux passing between the contacts includes the knob 24 which enables the switch to be rotated in the magnetic field.

Although the invention has been described with reference to specific embodiments, it is to be noted that other modifications and alternatives thereto may be made without departing from the spirit of the invention as defined in the following claims. By way of example, the block may have an opening in place of opening 40 which is large enough to accept the larger diameter of knob 24, and the projection 36 eliminated from knob 24. With this arrangement, the sides of the knob 24 may be exposed for manual adjustment on one of the sides of the block 44. Another embodiment may be specially adapted for use on a rectangular-shaped conductor instead of a circular conductor. In this embodiment, the mounting blocks may comprise a single flat block connected on one side of the conductor with the knob rotatably mounted in an opening of the block. The block may be bolted or otherwise affixed to the conductor. In either case, the reed switch is mounted on the rotatable knob.

What is claimed is:

1. A current level detector for a large, high current conductor comprising:
   a. first and second mounting members adapted to be mounted about and on such a conductor, one of said mounting members comprising a first circular bearing portion adapted for rotatably mounting a member;
   b. means for securing said mounting members together about such a conductor;
   c. a magnetic field responsive switch;
   d. a manually operable knob comprising a second circular bearing portion rotatably mounted on said first bearing portion; and
   e. means for mounting said magnetic field responsive switch on said knob, rotation of said knob thereby altering the position of said magnetic field responsive switch and thereby varying the magnetic field from such current carrying conductor passing along a predetermined axis of said magnetic field responsive switch.

2. A current level detector according to claim 1 for a circular conductor wherein said blocks each comprise a semi-circular portion, the semi-circular portions of said blocks being adapted for engaging the side of the circular conductor when secured thereto.

3. A current level detector according to claim 1 wherein said manually operable knob is non-magnetic and comprises an opening in which said magnetic field responsive switch is housed and secured.

4. A current level detector according to claim 1 wherein said switch comprises electrical contacts between which switching occurs responsive to a magnetic field and wherein said knob comprises an exposed surface and two electrical terminals mounted on said surface, said electrical contacts each being connected to a separate one of said terminals.

5. A current level detector for a large, high current conductor having a longitudinal axis comprising:
   a. first and second mounting blocks adapted to be mounted on such a conductor, one of said mounting blocks comprising a face and a circular aperture extending through the face into the block providing in the aperture a first bearing about an axis substantially perpendicular to said conductor axis;
   b. means for securing said mounting blocks together about such a conductor;
   c. a magnetic field responsive switch having two contacts between which switching occurs responsive to a magnetic field;
   d. a non-magnetic manually operable knob having an external circular portion forming a second bearing which is rotatably mounted in said first bearing about such axis of rotation, the knob being exposed from the corresponding block and having first and second conductive terminals exposed on said knob; and
   e. means for affixing said magnetic field responsive switch on said knob, each of said contacts being electrically connected to a separate one of said conductive terminals, rotation of said knob thereby altering the position of said magnetic field responsive switch and thereby varying the magnetic field from such current carrying conductor passing along a predetermined axis of said magnetic field responsive switch.

* * * * *